(12) United States Patent
Oguri et al.

(10) Patent No.: US 6,599,647 B2
(45) Date of Patent: Jul. 29, 2003

(54) JOINED INSULATOR BODY

(75) Inventors: Noriyasu Oguri, Gifu-pref. (JP); Osamu Imai, Kasugai (JP); Hironori Suzuki, Aichi-pref. (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/036,108

(22) Filed: Dec. 26, 2001

(65) Prior Publication Data

US 2002/0155326 A1 Oct. 24, 2002

(30) Foreign Application Priority Data

Dec. 27, 2000 (JP) ........................ 2000-397312
Nov. 5, 2001 (JP) ........................ 2001-339383

(51) Int. Cl.$^7$ ............................... B32B 9/00
(52) U.S. Cl. ............... 428/703; 428/697; 428/699; 428/701; 428/702; 428/469; 106/31.05; 106/692; 106/823
(58) Field of Search .................. 428/703, 697, 428/699, 701, 702, 469; 106/31.05, 692, 823

(56) References Cited

U.S. PATENT DOCUMENTS 4,088,804 A    5/1978   Cornwell et al.
4,394,175 A    7/1983   Cheriton et al.

FOREIGN PATENT DOCUMENTS

| DE | 36 10586 A1 | 12/1987 | |
| DE | 198 30 760 A1 | 1/2000 | |
| GB | 908073 | 10/1962 | |
| JP | 51-000310 B | 1/1976 | |
| JP | 55-018557 | * 2/1980 | ............. C21B/3/10 |
| JP | 57-007863 | * 1/1982 | ............ C04B/35/00 |
| JP | 5-42387 | 6/1993 | |
| JP | 9-208281 | * 12/1997 | ............ C04B/24/04 |
| JP | 11-131802 | * 5/1999 | ............ C04B/14/02 |

* cited by examiner

Primary Examiner—Deborah Jones
Assistant Examiner—Vivek KoppiKar
(74) Attorney, Agent, or Firm—Burr & Brown

(57) ABSTRACT

Alumina cement mortar is used as a source material for a kneaded cement cured body for joining hardware onto an insulator body, whereby the insulator can maintain high initial and long term mechanical strength and high electrical strength over a long period of time, and the curing time for forming the cured body is shortened to reduce the cost of producing the insulator. The alumina cement mortar is formed by kneading a mixture of alumina cement particles having a specific surface area of at least 3500 cm$^2$/g, a polymer-steric-hindrance type water reducing agent, an aggregate, and water, or an alumina cement mortar is obtained by kneading a mixture of alumina cement particles having an amorphous phase on an outer peripheral surface of particles and having a specific surface area of at least 3500 cm$^2$/g, a water reducing agent, an aggregate, and water.

20 Claims, 3 Drawing Sheets

JOINED INSULATOR BODY

This application claims priority from Japanese Application 2000-397312 filed Dec. 27, 2000 and Japanese Application 2001-339383 filed Nov. 5, 2001, the entireties of which are incorporated herein by reference.

BACKGROUND OF THE INVENTION

1. Field of the Invention

The present invention relates to an insulator such as a suspension type insulator, a long-rod insulator, a station post insulator (SP insulator), a line post insulator (LP insulator), a hollow insulator, or a solid-core insulator.

2. Description of the Background Art

As one form of insulators, there are insulators having hardware joined to at least one side of the insulator body via a cement kneaded product cured body. In the category of the insulators of this form, there are suspension type insulators, long-rod insulators, station post insulators (SP insulators), line post insulators (LP insulators), hollow insulators, solid-core insulators, and others. Typically, the insulator body is formed of an inorganic insulating material such as porcelain or glass. Japanese Examined Patent Application (Kokoku) No. 05-42387/1993 discloses a suspension type insulator which is a typical example of the insulators of this form.

The suspension type insulator includes a porcelain body, a metal cap joined to one side of the porcelain body via a cement mortar cured body, and a metal pin joined to the other side of said porcelain body via a cement mortar cured body. Generally, a Portland cement mortar is used in the cured body of the suspension type insulator. The Portland cement mortar is a cement kneaded product obtained by kneading a Portland cement, a water reducing agent, an aggregate, and water, and this is cured to form the cement mortar cured body. The cement mortar cured body in this state firmly joins the metal cap and the metal pin onto the porcelain body.

Further, in other insulators or hollow insulators of this form, a base hardware and a metal flange are adopted as hardware in place of the metal cap and the metal pin; however, in the case of assemblage by joining the base hardware and the metal flange onto one side or onto both sides of the insulator body or the hollow insulator body, a cement mortar cured body of Portland cement is used for joining the base hardware and the metal flange.

In the meantime, in the insulators of this form, high mechanical strength (tensile strength and others) and high electrical strength (dielectric breakdown strength and others) are required in view of the uses thereof, and also it is required that the high mechanical strength and the high electrical strength are maintained for a long period of time. For this reason, the cement mortar cured body requires a high mechanical strength of its own both initially and over a long period of time. In order to meet these requirements, it is optimal to use a cement that can form a cured body having a high strength as the cement constituting the cement mortar cured body.

For this reason, as a cement for forming the cement mortar cured body of an insulator of this type and form, it is desirable to adopt an alumina cement that can exhibit a high strength, as compared with a Portland cement, in place of the Portland cement that is currently used. Further, as compared with the Portland cement, the alumina cement has a small degree of shrinkage as a cement mortar cured body with small variation in the mechanical strength, thereby being advantageous in terms of strength, and also requires a short curing time for curing the cement mortar, thereby being advantageous in this respect as well.

However, since the alumina cement mortar shows dilatant flow properties, a difficulty is involved in the assemblage work for assembling the insulator by injecting the alumina cement mortar into a gap between the insulator body such as a porcelain body and a hardware such as a metal cap or a metal pin. Particularly, in the case of adopting means for allowing porcelain sands to adhere to the joining site of the insulator body, there arises a problem such that the assemblage work is made more difficult.

Therefore, an object of the present invention is to enable the adoption of alumina cement as a cement constituting the cement mortar cured body of an insulator of this type and form, so as to provide an insulator having a high mechanical strength and a high electrical strength and being capable of maintaining the high mechanical strength and the high electrical strength for a long period of time, and further to shorten the curing time in forming the cement mortar cured body to thereby reduce the cost of producing the insulator.

SUMMARY OF THE INVENTION

The present invention relates to insulators, particularly to suspension type insulators, long-rod insulators, station post insulators (SP insulators), line post insulators (LP insulators), hollow insulators, solid-core insulators, and others as objects of application.

Therefore, in the present invention, these insulators and hollow insulators are generally referred to as insulators; the dielectric bodies constituting these insulators and hollow insulators are generally referred to as insulator bodies; and the metal caps, metal pins, base hardware, and metal flanges constituting these insulators and hollow insulators are generally referred to as hardware.

Now, the first insulator according to the present invention is an insulator comprising an insulator body and a hardware joined to at least one side of the insulator body via a cement kneaded product cured body, characterized in that the cement kneaded product cured body is a cured body formed by curing a cement paste that is obtained by kneading an alumina cement having a specific surface area of at least 3500 cm$^2$/g and having an amorphous phase of at least 10 nm thickness on an outer peripheral surface of particles, a water reducing agent, and water, said cement paste being cured in a wet state and at a temperature of 40° C. or higher.

The second insulator according to the present invention is an insulator comprising an insulator body and a hardware joined to at least one side of the insulator body via a cement kneaded product cured body, characterized in that the cement kneaded product cured body is a cured body formed by curing a cement mortar that is obtained by kneading an alumina cement having a specific surface area of at least 3500 cm$^2$/g and having an amorphous phase of at least 10 nm thickness on an outer peripheral surface of particles, a water reducing agent, an aggregate, and water, the cement mortar being cured in a wet state and at a temperature of 40° C. or higher.

The first insulator and the second insulator according to the present invention belong to the first category which is one and the same category having the same principal construction with each other. In both of these insulators, the specific surface area of said alumina cement can be set within a range from 3500 cm$^2$/g to 5000 cm$^2$/g, and the thickness of the amorphous phase that the particles of said alumina cement has can be set within a range from 10 nm to $10^3$ nm. The thickness of the amorphous phase can be adjusted by a length of time for leaving the ground alumina cement to stand. Here, the length of time for leaving the alumina cement to stand represents the period of time in which the ground alumina cement is left to stand before being kneaded with water.

The third insulator according to the present invention is an insulator comprising an insulator body and a hardware joined to at least one side of the insulator body via a cement kneaded product cured body, characterized in that the cement kneaded product cured body is a cured body formed by curing a cement paste that is obtained by kneading an alumina cement having a specific surface area of at least 3500 cm$^2$/g, a polymer-steric-hindrance type water reducing agent, and water, the cement paste being cured in a wet state and at a temperature of 40° C. or higher.

The fourth insulator according to the present invention is an insulator comprising an insulator body and a hardware joined to at least one side of the insulator body via a cement kneaded product cured body, characterized in that the cement kneaded product cured body is a cured body formed by curing a cement mortar that is obtained by kneading an alumina cement having a specific surface area of at least 3500 cm$^2$/g, a polymer-steric-hindrance type water reducing agent, an aggregate, and water, the cement mortar being cured in a wet state and at a temperature of 40° C. or higher.

The third insulator and the fourth insulator according to the present invention belong to a second category which is one and the same category having the same principal construction with each other. In both of these insulators, a comb-shaped polymer of polycarboxylate series or an aminosulfonate polymer can be adopted as said polymer-steric-hindrance type water reducing agent.

In the first insulator and the third insulator according to the present invention, the mixing ratio of components of the cement paste constituting the cement kneaded product cured body can be set in such a manner that the water reducing agent is 5 wt % or less and the water is within a range from 15 wt % to 30 wt % with respect to the alumina cement.

In the second insulator and the fourth insulator according to the present invention, the mixing ratio of components of the cement mortar constituting the cement kneaded product cured body can be set in such a manner that the water reducing agent is 5 wt % or less, the aggregate is 100 wt % or less, and the water is within a range from 15 wt % to 30 wt % with respect to the alumina cement.

In the first insulator to the fourth insulator according to the present invention, one can adopt an alumina cement having a composition containing $Al_2O_3$ within a range from 45 wt % to 60 wt %, CaO within a range from 30 wt % to 40 wt %, $SiO_2$ of 10 wt % or less, and $Fe_2O_3$ of 5 wt % or less, as said alumina cement.

In the first insulator and the second insulator belonging to the first category according to the present invention, an alumina cement having a specific surface area of at least 3500 cm$^2$/g and having an amorphous phase of at least 10 nm thickness on an outer peripheral surface of alumina cement particles is adopted as a cement for forming a cement paste or cement mortar constituting a cement kneaded product cured body that joins a hardware to at least one side of an insulator body; and the prepared cement paste or cement mortar is cured in a wet state and at a temperature of 40° C. or higher to form the cement kneaded product cured body.

In the third insulator and the fourth insulator belonging to the second category according to the present invention, an alumina cement having a specific surface area of at least 3500 cm$^2$/g is adopted as a cement for forming a cement paste or cement mortar constituting a cement kneaded product cured body that joins a hardware to at least one side of an insulator body; a polymer-steric-hindrance type water reducing agent is adopted as a water reducing agent; and the prepared cement paste or cement mortar is cured in a wet state and at a temperature of 40° C. or higher to form the cement kneaded product cured body.

Although the alumina cement paste or alumina cement mortar contains alumina cement as a base, the cement paste or cement mortar used for the work of assembling each insulator belonging to the first category according to the present invention has smaller dilatant flow properties due to the defined properties of the alumina cement, so that the cement paste or cement mortar can be injected more smoothly into a gap between the insulator body and the hardware at the time of the work of assembling the insulator, thereby facilitating the work of assembling the insulator.

In other words, use of alumina cement paste and alumina cement mortar is enabled for the work of assembling the insulator. Particularly, in the case of adopting means for allowing porcelain sands to adhere to the joining site of the insulator body, adoption of alumina cement paste and alumina cement mortar is enabled for the work of assembling the insulator which assemblage work was more difficult. Further, the constructed cement kneaded product cured body has the desired high mechanical strength and high electrical strength due to the alumina cement, and also these strengths can be maintained over a long period of time.

Thus, in the first insulator and the second insulator belonging to the first category according to the present invention, the good flow properties of the cement paste or cement mortar used for the work of assembling the insulators improves the close adhesion to the insulator body and to the hardware and, in synergism with the action of the alumina cement, contributes also to the improvement of the mechanical strength and the electrical strength as an insulator.

Therefore, in each insulator belonging to the first category according to the present invention, the cement kneaded product cured body that functions to join a hardware to an insulator body has a high strength both at an initial stage and over a long period of time due to the alumina cement, so that the cement kneaded product cured body has a high mechanical strength and a high electrical strength, and the high mechanical strength and the high electrical strength can be maintained for a long period of time. Further, since the alumina cement paste and the alumina cement mortar are cured in a short period of time, the cost of producing the insulators can be reduced due to the decrease of the curing time.

Further, although the alumina cement paste or alumina cement mortar contains alumina cement as a base, the cement paste or cement mortar used for the work of assembling the third insulator and the fourth insulator belonging to the second category according to the present invention has smaller dilatant flow properties due to the defined properties of the alumina cement and the water reducing agent, so that the cement paste or cement mortar can be injected more smoothly into a gap between the insulator body and the hardware at the time of the work of assembling the insulator, thereby facilitating the work of assembling the insulator. For this reason, the insulators belonging to the second category according to the present invention produce the same actions and effects as the insulators belonging to the first category.

The mixing ratio of the components of the alumina cement paste constituting the cement kneaded product cured body that exhibits such excellent functions is preferably such that the water reducing agent is 5 wt % or less and the water is within the range from 15 wt % to 30 wt % with respect to the alumina cement. The mixing ratio of the components of the alumina cement mortar adopted for constructing the cement kneaded product cured body is preferably such that the water reducing agent is 5 wt % or less, the aggregate is 100 wt % or less, and the water is within the range from 15 wt % to 30 wt % with respect to the alumina cement.

Further, the alumina cement adopted in these alumina cement paste and alumina cement mortar preferably has a composition containing $Al_2O_3$ within a range from 45 wt % to 60 wt %, CaO within a range from 30 wt % to 40 wt %, $SiO_2$ of 10 wt % or less, and $Fe_2O_3$ of 5 wt % or less.

The $Al_2O_3$ value and the CaO value of the alumina cement are preferably such that $Al_2O_3$ is within the range from 45 wt % to 60 wt % and CaO is within the range from 30 wt % to 40 wt % in view of the setting properties of the cement paste and the cement mortar, the mechanical properties of the cured products of these, and their costs. Further, the $SiO_2$ value and the $Fe_2O_3$ value of the alumina cement are preferably such that $SiO_2$ is 10 wt % or less and $Fe_2O_3$ is 5 wt % or less because, if these are contained in a large amount, these cause retarded setting and decrease in the mechanical strength.

The water in the alumina cement paste and the alumina cement mortar is preferably within the range from 15 wt % to 30 wt % because, the less the water is, the poorer the workability of assembling the insulators will be, though the mechanical strength of the cured product will be improved. The aggregate in the alumina cement mortar is preferably 100 wt % or less because a large amount of aggregate will deteriorate the flow properties of the cement mortar and gives adverse effects on the workability of assembling the insulators, though the aggregate contributes to the improvement of the mechanical strength of the cured product.

Regarding the water reducing agent, there are polymer-steric-hindrance type water reducing agents, electrostatic repulsion type water reducing agents, and others.

In particular, in the third insulator and the fourth insulator belonging to the second category according to the present invention, a polymer-steric-hindrance type is adopted as the water reducing agent. The polymer-steric-hindrance type water reducing agent subjectively exhibits the dispersion action of polymer-steric-hindrance types, such as comb-shaped polymers of polycarboxylate series and aminosulfonate polymers, where comb-shaped polymers of polycarboxylate series are more preferable.

Such a polymer-steric-hindrance type water reducing agent, when adsorbed onto alumina cement particles, extends the side chains such as polyether chains to surround the alumina cement particles to form a steric hindrance, thereby showing a high dispersion and a high fluidity. The longer the side chains are, the larger this effect is. Further, such a polymer-steric-hindrance type water reducing agent has a characteristic such that retarded setting is less liable to occur. The amount of the polymer-steric-hindrance type water reducing agent used is 5 wt % or less, and addition of the polymer-steric-hindrance type water reducing agent exceeding 5 wt % will not produce an effect larger than that.

Thus, in the third insulator and the fourth insulator belonging to the second category according to the present invention, a polymer-steric-hindrance type water reducing agent is adopted as the water reducing agent. In contrast, in the first insulator and the second insulator belonging to the first category according to the present invention, assuming that a conventionally used ordinary water reducing agent can also be used as the water reducing agent, the thickness of the amorphous phase that the alumina cement particles have on the outer peripheral surface is specified to 10 nm or more in addition to specifying the specific surface area of the alumina cement.

This improves the flow properties of the cement paste and the cement mortar and improves the strength of the cement kneaded product cured body. The reason why these effects are produced seems to be as follows.

Alumina cement has a high surface activity immediately after being ground. For this reason, in the case of preparing a cement paste or cement mortar using an alumina cement having a high surface activity immediately after being ground, the hydration reaction of alumina cement with water proceeds rapidly at the time of kneading. As a result of this, it seems that the elution of calcium ions, aluminum ions, and others increases rapidly in the cement paste or cement mortar, whereby the viscosity of the cement paste or cement mortar increases to reduce the flow value, and the assemblage workability is deteriorated.

Further, if the hydration reaction of alumina cement with water proceeds rapidly, pores and defects are generated in the cement kneaded product, thereby decreasing the density. It seems that, because of this, the cement cured body will have a decreased strength, and a decrease in the tensile strength of the insulator will be invited.

On the other hand, when the alumina cement is left to stand immediately after being ground, for example, in air, the moisture in the air is adsorbed onto the outer peripheral surface of the alumina cement particles to produce an amorphous phase on the outer peripheral surface of the alumina cement particles, thereby decreasing the surface activity of the alumina cement. It seems that production of the amorphous phase restrains the elution of ions from the alumina cement, and the shape of the alumina cement particles is improved to a rounded shape to decrease the viscosity of the cement paste or cement mortar. Further, it seems that the production of the amorphous phase reduces the speed of the hydration reaction in the cement kneaded product, thereby restraining the decrease in the strength of the cured body that is caused by the rapid hydration reaction.

Here, in view of the surface activity of the alumina cement, the larger the specific surface area of the alumina cement is, the higher the surface activity will be. Therefore, it is not necessarily desirable that the specific surface area of the alumina cement exceeds 5000 $cm^2/g$.

BRIEF DESCRIPTION OF THE DRAWINGS

These and other objects, features, aspects, and advantages of the present invention will become more apparent from the following detailed description of the present invention when taken in conjunction with the accompanying drawings, in which.

DETAILED DESCRIPTION OF THE INVENTION

Figure 1:
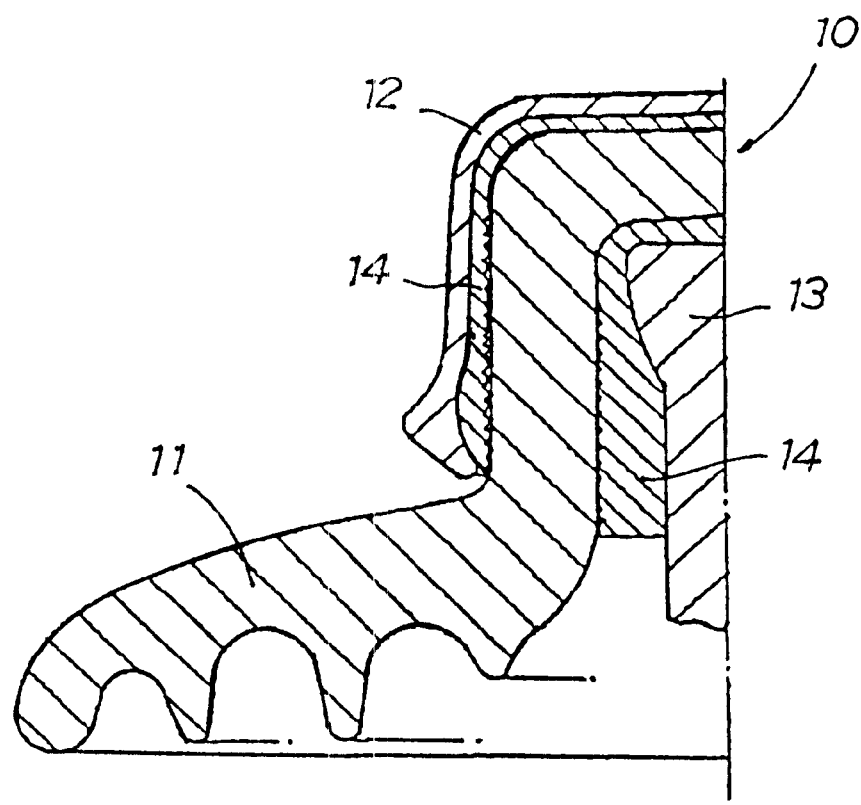
FIG. 1 is a longitudinal cross-sectional view of a partially omitted suspension type insulator according to one example of the present invention.

The present invention is an insulator comprising an insulator body and a hardware member joined to at least one side of the insulator body via a cement kneaded product cured body. In the embodiments of the present invention, a suspension type insulator which is a representative example thereof is presented in FIG. 1. Here, since the suspension type insulator has a symmetric configuration in the right-and-left direction, the suspension type insulator is illustrated in FIG. 1 by omitting a right half portion thereof with respect to the center line in the right-and-left direction.

The suspension type insulator 10 is constructed with an umbrella-shaped porcelain body 11, a metal cap 12, a metal pin 13, and a cement mortar cured body 14 that joins the metal cap 12 and metal pin 13 respectively onto porcelain body 11. The suspension type insulator 10 is constructed in the same manner as a conventional suspension type insulator except for the composition of the cement mortar cured body 14 and the cement mortar which is the source material of the cement mortar cured body 14.

Here, in the insulators according to the present invention, instead of the cement mortar cured body 14, one can adopt a cement paste cured body having the same composition as the cement mortar cured body 14 except that the aggregate is omitted.

The insulators according to the present invention include two different types of insulators, i.e. insulators belonging to the first category and the insulators belonging to the second category, by selection of an alumina cement and a water reducing agent for forming a cement mortar constituting the cement mortar cured body 14.

In the insulators belonging to the first category according to the present invention, cement mortar cured body 14 is formed by curing an alumina cement mortar, which is obtained by kneading four members, i.e. alumina cement, water reducing agent, aggregate, and water, in a wet state and at a temperature of 40° C. or higher for hardening. Thus, an alumina cement having specific properties is adopted as the alumina cement for improving the workability of the assemblage work to join the metal cap 12 and the metal pin 13 to the porcelain body 11 and for allowing a high joining strength of the formed cement mortar cured body 14 to be exhibited.

Also, the same applies to the insulators belonging to the second category according to the present invention. The cement mortar cured body 14 is formed by curing an alumina cement mortar, which is obtained by kneading four members, i.e. alumina cement, water reducing agent, aggregate, and water, in a wet state and at a temperature of 40° C. or higher for hardening. Thus, an alumina cement having a specific property is adopted as the alumina cement and a water reducing agent having a specific property is adopted as the water reducing agent for improving the workability of the assemblage work to join the metal cap 12 and the metal pin 13 to the porcelain body 11 and for allowing a high joining strength of the formed cement mortar cured body 14 to be exhibited.

Therefore, the insulators belonging to the first category and the insulators belonging to the second category according to the present invention aim at achieving the same goal according to the present invention by adopting alumina cement mortars having different properties from each other. Hereafter, these insulators will be described individually.

For the cement mortar cured body 14 constituting the insulators belonging to the first category and the insulators belonging to the second category according to the present invention, the specific surface area of the alumina cement, which is an essential construction requirement, has been measured on the basis of the air permeability test (Blaine air permeability test). Further, the identification of the amorphous phase that the particles of the alumina cement (alumina cement particles) have has been carried out by fine structure analysis using an electron microscope in a state in which carbon is vapor-deposited on the surface of the alumina cement particles. Differentiation can be made because no lattice image is seen in the amorphous phase, and a diffusion ring specific to the amorphous phase appears when a diffraction image is captured by applying spot electron beams. The thickness of the amorphous phase was determined by making measurements at each site of the alumina cement particles on the basis of this diffraction image, and the average value thereof was determined as the thickness. Here, the principal components of the amorphous phase are CaO and $Al_2O_3$.

First, an embodiment of the insulators belonging to the first category according to the present invention will be described. The insulator of this embodiment corresponds to the second insulator according to the present invention, so that the insulator of this embodiment will be hereafter referred to as the second insulator.

The cement mortar constituting the cement mortar cured body of the second insulator of this embodiment is formed of four members, i.e. alumina cement, water reducing agent, aggregate, and water, where the alumina cement has a specific surface area of at least 3500 $cm^2/g$, preferably within the range from 4000 $cm^2/g$ to 5000 $cm^2/g$, and has a composition containing $Al_2O_3$ within the range from 45 wt % to 60 wt %, CaO within the range from 30 wt % to 40 wt %, $SiO_2$ of 10 wt % or less, and $Fe_2O_3$ of 5 wt % or less. Further, the alumina cement particles have an amorphous phase having a thickness of at least 10 nm, preferably within the range from 10 nm to $10^3$ nm, on the outer peripheral surface thereof. The amorphous phase of the alumina cement particles is formed by leaving the alumina cement to stand immediately after being ground for a predetermined period of time, and the thickness of the amorphous phase can be easily adjusted by changing the length of time that the alumina cement is left to stand after being ground before being kneaded with water.

Further, the water reducing agent for forming the alumina cement mortar is not particularly limited, and various kinds of water reducing agents that are ordinarily put to use can be used. Further, the aggregate may be one that is ordinarily used and, for example, silica sand having an average particle diameter within the range from 500 $\mu$m to 50 $\mu$m is preferable.

Because of having small dilatant flow properties, the alumina cement mortar facilitates the work of assembling the suspension type insulator 10. In other words, the alumina cement mortar makes it possible to adopt alumina cement in the work of assembling the suspension type insulator 10. The ratio (water ratio W/C) of water (W) to cement (C) in the alumina cement mortar is preferably set to be within the range from 15% to 30%.

In the work of assembling the suspension type insulator 10, the alumina cement mortar is injected and allowed to intervene between the top of the porcelain body 11 on the front surface side and the metal cap 12 and between the recess of the porcelain body 11 on the rear surface side and the metal pin 13, and is cured in this intervening state to be formed into the cement mortar cured body 14. The curing of the alumina cement mortar is carried out in a wet state and at a temperature of 40° C. or higher. Preferably, the alumina cement mortar is steam-cured at a temperature within the range from 50° C. to 80° C.

The cement mortar cured body 14 formed by curing the alumina cement mortar has a high mechanical strength deriving from the alumina cement. For this reason, the suspension type insulator 10 having the cement mortar cured body 14 as means for joining the metal cap 12 and the metal pin 13 has a high mechanical strength and a high electrical strength, and the high mechanical strength and the high electrical strength can be maintained for a long period of time. Further, the alumina cement mortar requires a shorter period of time for curing and, by reducing the curing time, the cost of producing the insulator 10 can be reduced.

Next, an embodiment of the insulators belonging to the second category according to the present invention will be described. The insulator of this embodiment corresponds to the fourth insulator according to the present invention, so that the insulator of this embodiment will be hereafter referred to as the fourth insulator.

The cement mortar constituting the cement mortar cured body of the fourth insulator of this embodiment is formed of four members, i.e. alumina cement, water reducing agent, aggregate, and water, where the alumina cement has a specific surface area of at least 3500 cm$^2$/g, preferably within the range from 4000 cm$^2$/g to 5000 cm$^2$/g, and has a composition containing $Al_2O_3$ within the range from 45 wt % to 60 wt %, CaO within the range from 30 wt % to 40 wt %, $SiO_2$ of 10 wt % or less, and $Fe_2O_3$ of 5 wt % or less. Further, the water reducing agent is a polymer-steric-hindrance type water reducing agent, and is a comb-shaped polymer of polycarboxylate series or an aminosulfonate polymer. Further, the aggregate may be one that is ordinarily used. For example, silica sand having an average particle diameter within the range from 500 μm to 50 μm is preferable.

The mixing ratio of the four members, i.e. the alumina cement, polymer-steric-hindrance type water reducing agent, aggregate, and water, in the cement mortar is suitably such that the polymer-steric-hindrance type water reducing agent is 5 wt % or less, the aggregate is 100 wt % or less, and the water is within the range from 15 wt % to 30 wt % with respect to the alumina cement.

Due to its small dilatant flow properties, the alumina cement mortar facilitates the work of assembling the suspension type insulator 10. In other words, the alumina cement mortar makes it possible to adopt alumina cement in the work of assembling the suspension type insulator 10. The ratio (water ratio W/C) of water (W) to cement (C) in the alumina cement mortar is preferably set to be within the range from 15% to 30%.

In the work of assembling the suspension type insulator 10, the alumina cement mortar is injected and allowed to intervene between the top of the porcelain body 11 on the front surface side and the metal cap 12 and between the recess of the porcelain body 11 on the rear surface side and the metal pin 13, and is cured in this intervening state to be formed into the cement mortar cured body 14. The curing of the alumina cement mortar is carried out in a wet state and at a temperature of 40° C. or higher. Preferably, the alumina cement mortar is steam-cured at a temperature within the range from 50° C. to 80° C.

The cement mortar cured body 14 formed by curing the alumina cement mortar has a high mechanical strength derived from the alumina cement. For this reason, the suspension type insulator 10 having the cement mortar cured body 14 as means for joining the metal cap 12 and the metal pin 13 has a high mechanical strength and a high electrical strength, and the high mechanical strength and the high electrical strength can be maintained for a long period of time. Further, the alumina cement mortar requires a shorter period of time for curing and, by reducing the curing time, the cost of producing the insulator 10 can be reduced.

EXAMPLES

In these Examples, the work of assembling suspension type insulators having a construction shown in FIG. 1 is carried out using various cement mortars to confirm the possibility of using the alumina cement mortar as a source material for constructing a cement mortar cured body, to specify the mixing ratio of the components of the usable alumina cement and cement mortar, to specify the type of water reducing agent, and to specify a suitable condition of curing the alumina cement mortar. These confirmations and specifications were carried out on the basis of the evaluation of the workability of assembling the suspension type insulators and the properties of the assembled suspension type insulators in terms of strength.

Example 1

In this Example, an experiment was carried out on the usability of alumina cement mortar as a source material for constructing a cement mortar cured body. In this experiment, an alumina cement mortar constituting the cement cured body according to the fourth insulator of the present invention (Examples 1-1, 1-2), an alumina cement mortar according to Comparative Example (Comparative Example 1-1), and a Portland cement mortar that is ordinarily used (Comparative Example 1-2) were adopted as a source material for constructing the cement mortar cured body. The composition of each of these cement mortars is shown in Table 1.

TABLE 1

(cement mortar)

| composition | | Example 1 | | Comparative Example 1 | |
| --- | --- | --- | --- | --- | --- |
| | | 1-1 | 1-2 | 1-1 | 1-2 |
| cement | type | alumina | alumina | alumina | Portland |
| | specific surface area | 4500 cm$^2$/g | 4500 cm$^2$/g | 4500 cm$^2$/g | 4000 cm$^2$/g |
| water reducing agent | type | steric-hindrance type 1 | steric-hindrance type 2 | electrostatic repulsion type 1 | elctrostatic repulsion type 2 |
| | weight ratio | 0.3 wt % | 0.5 wt % | 1.0 wt % | 0.1 wt % |
| aggregate | type | silica sand | silica sand | silica sand | silica sand |
| | weight ratio | 25 wt % | 25 wt % | 25 wt % | 25 wt % |
| water ratio (W/C) | | 25% | 25% | 30% | 30% | alumina cement composition: $Al_2O_3$...55 wt %, CaO...35 wt %, $SiO_2$...5 wt %, $Fe_2O_3$...0.5 wt %
water reducing agent: steric-hindrance type 1 (comb-shapedpolymer of polymer steric-hindrance type polycarboxylate series)...carboxyl group containing polyether series compound steric-hindrance type 2 (polymer steric hindrance type aminosulfonate polymer)...aminosulfonate polymer elctrostatic repulsion type 1 ... naphthalenesulfonic acid formalin condensate elctrostatic repulsion type 2...oxycarboxylate
aggregate (silica sand): average particle diameter 250 μm
weight ratio: weight ratio to cement By adopting each of these cement mortars, the work of assembling a suspension type insulator (corresponding to the fourth insulator according to the present invention) is carried out in which the metal cap is joined to the front surface side of the porcelain body (with porcelain sand) and the metal pin is joined to the rear surface side of the porcelain body. The cement mortar intervening between the porcelain body and the metal cap and the cement mortar intervening between the porcelain body and the metal pin are cured to form a cement mortar cured body made from these cement mortars as a source material, thereby to prepare a suspension type insulator.

However, as a condition for curing the cement mortars, steam curing at a curing temperature of 60° C. for 1.5 hours is adopted. The workability (flow value and repulsion force value of cement mortar) of assembling these suspension type insulators and the strength properties (tensile strength and tensile strength decrease ratio after accelerated aging) of the prepared suspension type insulators are shown in Table 2.

TABLE 2

(assemblage workability and strength)

| Characteristics | | Example 1 | | Comparative Example 1 | |
|---|---|---|---|---|---|
| | | 1-1 | 1-2 | 1-1 | 1-2 |
| assemblage workability | 1/2 flow value (mm) | 300 or more | 280 | 180 | 280 |
| | repulsion force (kg) | 1 or less | 1 | 5 or more | 1 or less |
| strength of insulator | tensile strength (kN) | 215 | 207 | 174 | 166 |
| | strength decrease ratio (%) | 1.6 | 2.7 | 7.1 | 11.0 |
| evaluation | | ⊚ | ○ | X | X | tensile strength (kN): initial strength
strength decrease ratio (%): decrease ratio of tensile strength after accelerated aging, where the tensile strength after accelerated aging represents a long-term strength
evaluation:⊚...good, ○...fairly good, X...poor The flow value of the cement mortar was measured on the basis of JIS (Japanese Industrial Standard) R5201; however, a flow cone having half of the volume of the standard cone was adopted. The higher the flow value is, the better the flow properties of the cement mortar is.

The repulsion force value was measured using a rheometer. A cement mortar was put into a 31.5 mm diameter cylinder in which a piston rod having a 24 mm diameter piston part has been inserted, and the maximum load in the case of pulling the piston rod at a speed of 30 cm/min was determined as the repulsion force value. Regarding the cement mortars, the higher the repulsion force is, the stronger the dilatant properties are, thus making it more difficult to inject a cement mortar into gaps between the porcelain body and the metal cap and between the porcelain body and the metal pin to provide poor assemblage workability.

The tensile strength of the suspension type insulator was measured using an Amsler testing machine. In order to avoid hardware (metal cap and metal pin) destruction, high-strength hardware was used to assemble the insulator. The tensile destruction load was measured, and the average value of five measurements was determined as the tensile strength value.

Also, the tensile strength after accelerated aging was measured in the same manner. Here, an insulator obtained by accelerated aging (exposure in air of 80° C. for one month after immersion in hot water of 85° C. for three months) of a completely cured insulator was adopted as a subject of test for tensile strength after accelerated aging. The tensile strength decrease ratio after accelerated aging was calculated by the decrease ratio of the tensile strength after accelerated aging relative to the initial tensile strength. Regarding the cement mortar cured bodies, the cement hardens and shrinks under an accelerated aging condition, so that the properties of the cement mortar cured bodies after a long period of time can be evaluated by the tensile strength decrease ratio after accelerated aging. The smaller the tensile strength decrease ratio is, the better the long-term mechanical strength of the insulator is.

According to this experiment, in the work of assembling a suspension type insulator in the case of using a specified alumina cement mortar as a source material for forming a cement mortar cured body, the workability thereof is good in the same manner as in the case of using a conventional Portland cement mortar, and it has been confirmed that one can use an alumina cement mortar that uses a polymer-steric-hindrance type water reducing agent as a water reducing agent, as a source material for forming the cement mortar cured body. Further, it has been confirmed that a cement mortar cured body made of an alumina cement mortar forms a suspension type insulator having properties with a high tensile strength and a high tensile strength after accelerated aging, which are derived from the use of alumina cement and polymer-steric-hindrance type water reducing agent.

Example 2

In this Example, an experiment was carried out to confirm a suitable range of the specific surface area of the alumina cement for forming an alumina cement mortar that is used as a source material for forming a cement mortar cured body in the work of assembling a suspension type insulator (with porcelain sand). The alumina cement mortars put to use are basically the same as the alumina cement mortars adopted in Example 1 (Example 1-1); however, alumina cements having various different values of specific surface area with each other are adopted. The specific surface area of the alumina cements in these alumina cement mortars is shown in Table 3.

By adopting each of these alumina cement mortars, the work of assembling a suspension type insulator (corresponding to the fourth insulator according to the present invention) is carried out. The alumina cement mortar intervening between the porcelain body and the metal cap and the alumina cement mortar intervening between the porcelain body and the metal pin are cured to form a cement mortar cured body made from these alumina cement mortars as a source material, thereby to prepare a suspension type insulator. Here, the condition of curing the alumina cement mortars is the same as that of Example 1. The workability (flow value and repulsion force value) of assembling these suspension type insulators and the strength properties (tensile strength and tensile strength decrease ratio after accelerated aging) of the obtained suspension type insulators are shown in Table 3.

TABLE 3

(specific surface area of alumina cement)

| mortar (No) | specific surface area of alumina cement (cm²/g) | assemblage workability | | strength of insulator | | evaluation |
|---|---|---|---|---|---|---|
| | | 1/2 flow value (mm) | repulsion force (kg) | tensile strength (kN) | decrease ratio (%) | |
| 1 | 2987 | 300 or more | 1 or less | 148 | 10.3 | X |
| 2 | 3505 | 300 or more | 1 or less | 181 | 4.7 | ○ |
| 3 | 4001 | 300 or more | 1 or less | 204 | 2.2 | ⊚ |
| 4 | 4462 | 290 | 1 or less | 216 | 1.8 | ⊚ |
| 5 | 4986 | 245 | 1 | 200 | 2.3 | ○ | evaluation:⊚...good, ○...fairly good, X...poor

By making reference to Table 3, it is confirmed that the specific surface area of the alumina cement in the alumina cement mortar affects the initial strength and the long-term strength of the suspension type insulator. It is confirmed that, in order to provide a good workability of the work of assembling the suspension type insulator and to obtain a suspension type insulator having a high strength, the specific surface area of the alumina cement is 3500 cm²/g or more, preferably 4000 cm²/g more.

Example 3

In this Example, an experiment was carried out to confirm a suitable range of the mixing ratio of the components of the alumina cement mortar that is used as a source material for forming a cement mortar cured body in the work of assembling a suspension type insulator (with porcelain sand). The composition of the alumina cement mortars put to use is basically the same as that of the alumina cement mortars adopted in Example 1 (Example 1-1). However, alumina cement mortars having various different mixing ratios of the components with each other are adopted. The mixing ratio of the components in these alumina cement mortars is in Table 4.

By adopting each of these alumina cement mortars, the work of assembling a suspension type insulator (corresponding to the fourth insulator according to the present invention) is carried out. The alumina cement mortar intervening between the porcelain body and the metal cap and the alumina cement mortar intervening between the porcelain body and the metal pin are cured to form a cement mortar cured body made from these alumina cement mortars as a source material, thereby to prepare a suspension type insulator. Here, the condition of curing the alumina cement mortars is the same as that of Example 1. The workability (flow value and repulsion force value of the cement mortar) of assembling the suspension type insulators and the strength properties (tensile strength and tensile strength decrease ratio after accelerated aging) of the prepared suspension type insulators are shown in Table 4.

By making reference to Table 4, it is recognized that the mixing ratio of the components of the alumina cement mortar affects the workability of the work of assembling the suspension type insulator and the strength (initial strength and long-term strength) of the suspension type insulator. It is confirmed that, in order to provide a good workability of the work of assembling the suspension type insulator and to obtain a suspension type insulator having a high strength, the polymer-steric-hindrance type water reducing agent is preferably 5 wt % or less and the aggregate is preferably 100 wt % or less with respect to the alumina cement, and the water ratio is preferably within the range from 15 wt % to 30 wt %.

Example 4

In this Example, an experiment was carried out to confirm a suitable curing condition for forming an alumina cement mortar used in the work of assembling a suspension type insulator (with porcelain sand) into a cement mortar cured body. The composition of the alumina cement mortars put to use is the same as that of the alumina cement mortars adopted in Example 1 (Example 1-1).

With the use of these alumina cement mortars, the work of assembling a suspension type insulator (corresponding to the fourth insulator according to the present invention) is carried out. The alumina cement mortar intervening between the porcelain body and the metal cap and the alumina cement mortar intervening between the porcelain body and the metal pin are steam-cured under a suitable condition to form a cement mortar cured body, thereby to prepare a suspension type insulator. The curing condition was such that the curing time was 1.5 hours and the curing temperature was within the range from 30° C. to 90° C. The curing temperature and the strength properties (tensile strength and tensile strength decrease ratio after accelerated aging) of the suspension type insulators are shown in Table 5.

TABLE 4

(alumina cement mortar)

| mortar (No) | component ratio (parts by weight) | | | | assemblage workability | | strength of insulator | | evaluation |
|---|---|---|---|---|---|---|---|---|---|
| | cement | aggregate | water reducing agent | water | 1/2 flow value (mm) | repulsion force (kg) | tensile strength (kN) | strength decrease ratio (%) | |
| 1 | 100 | 150 | 0.5 | 30 | 260 | 3 | 170 | 4.8 | ○ |
| 2 | 100 | 100 | 3 | 20 | 210 | 2 | 222 | 1.0 | ⊙ |
| 3 | 100 | 50 | 10 | 28 | 300 or more | 1 or less | 191 | 3.5 | ○ |
| 4 | 100 | 25 | 1.0 | 15 | 160 | 4 | 204 | 1.9 | ⊙ |
| 5 | 100 | 75 | 5 | 20 | 240 | 2 | 217 | 1.1 | ⊙ |
| 6 | 100 | 50 | 3 | 25 | 300 or more | 1 or less | 203 | 2.4 | ⊙ |
| 7 | 100 | 0 | 1.0 | 25 | 300 or more | 1 or less | 188 | 4.0 | ○ |
| 8 | 100 | 75 | 0.5 | 35 | 300 or more | 1 or less | 150 | 6.8 | ○ |
| 9 | 100 | 25 | 0.3 | 25 | 290 | 1 or less | 205 | 2.3 | ⊙ | evaluation: ⊙ . . . good, ○ . . . fairly good, x . . . poor

TABLE 5

(curing of alumina cement mortar)

| cement mortar (No) | curing temperature (° C.) | tensile strength (kN) | strength decrease ratio (%) | evaluation |
|---|---|---|---|---|
| 1 | 30 | 221 | 30.3 | X |
| 2 | 40 | 200 | 3.8 | ○ |
| 3 | 50 | 212 | 2.7 | ⊚ |
| 4 | 60 | 215 | 1.9 | ⊚ |
| 5 | 70 | 211 | 2.3 | ⊚ |
| 6 | 80 | 210 | 2.9 | ⊚ |
| 7 | 90 | 206 | 4.0 | ○ | evaluation:⊚...good, ○...fairly good, X...poor

By making reference to Table 5, it is recognized that the curing temperature of the alumina cement mortar affects the strength (initial strength and long-term strength) of the suspension type insulator. In order to obtain a suspension type insulator having a high strength, one must cure at a temperature of 40° C. or higher, and preferably it is preferable to cure at a temperature within the range from 50° C. to 80° C.

In curing an alumina cement mortar, if the curing temperature is 30° C. or lower, the tensile strength after accelerated aging decreases. By this curing, $CAH_{10}$ is recognizable in the X-ray analysis of the cement mortar cured product, and this $CAH_{10}$ seems to be a factor for the decrease of the tensile strength after accelerated aging. In the case where the curing temperature is 40° C. or higher, $CAH_{10}$ is not recognizable, and approximately $C_3AH_6$ and $AH_3$ (partly $C_2AH_8$) are recognizable. Here, in these formulas, C, A, and H represent CaO, $Al_2O_3$, and $H_2O$, respectively.

In this experiment, the curing time is set to be 1.5 hours. If the curing time is one hour, there are cases in which the curing is insufficient. It has been confirmed that, if the curing time is 1.5 hours or more, a suspension type insulator having a high strength can be prepared.

Here, the above Examples are directed to suspension type insulators; however, it has been confirmed that approximately the same results as the results of the above-described Examples can be obtained for the insulators other than the suspension type insulators, namely, long-rod insulators, station post insulators (SP insulators), line post insulators (LP insulators), hollow insulators, solid-core insulators, and others.

Example 5

In this Example, an experiment was carried out to confirm a suitable range of the properties (specific surface area and thickness of the amorphous phase that the alumina cement particles have) of the alumina cement for forming the alumina cement mortar used as a source material of a cement mortar cured body in the work of assembling a suspension type insulator (with porcelain sand).

As an alumina cement mortar to be used, seven kinds of alumina cement mortar having a composition containing an alumina cement, a water reducing agent (0.3 wt % with respect to alumina cement), and an aggregate (silica sand: 25 wt % with respect to alumina cement) having an average particle diameter of 250 μm with a water ratio (W/C) of 25% were adopted.

Each of the alumina cements used for the preparation of the alumina cement mortars has a composition containing 55 wt % of $Al_2O_3$, 35 wt % of CaO, 5 wt % of $SiO_2$, and 0.5 wt % of $Fe_2O_3$, and all have an amorphous phase having a thickness within the range from 10 nm to 50 nm on the outer peripheral surface of the alumina cement particles, but with different specific surface areas with each other, as shown in Table 6.

Here, each of the alumina cements used for the preparation of the alumina cement mortars is one in which the thickness of the amorphous phase was adjusted to be within the range from 10 nm to 50 nm by leaving the alumina cement to stand in an atmosphere with a temperature of 20° C. to 25° C. and a relative humidity of 50% to 60% for 20 days to 60 days after being generated and produced by grinding.

By adopting these alumina cement mortars, the work of assembling a suspension type insulator (corresponding to the second insulator according to the present invention) is carried out. The alumina cement mortar intervening between the porcelain body and the metal cap and the alumina cement mortar intervening between the porcelain body and the metal pin are cured to form a cement mortar cured body made from these alumina cement mortars as a source material, thereby to prepare a suspension type insulator. Here, the condition of curing the alumina cement mortars is the same as that of Example 1.

Figure 2:
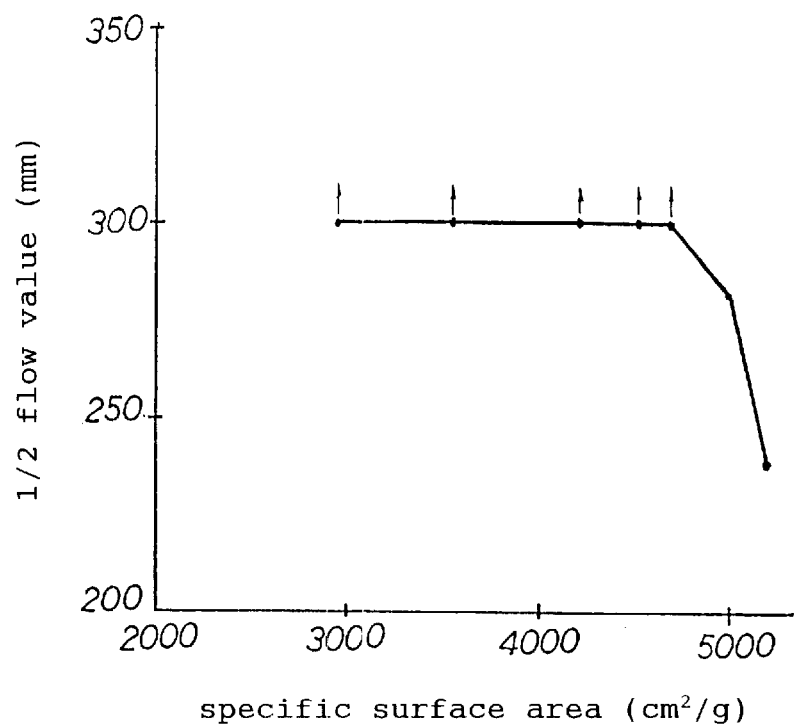
FIG. 2 is a graph showing a relationship between the flow value and the specific surface area of an alumina cement that forms a cement mortar cured body.
Figure 3:
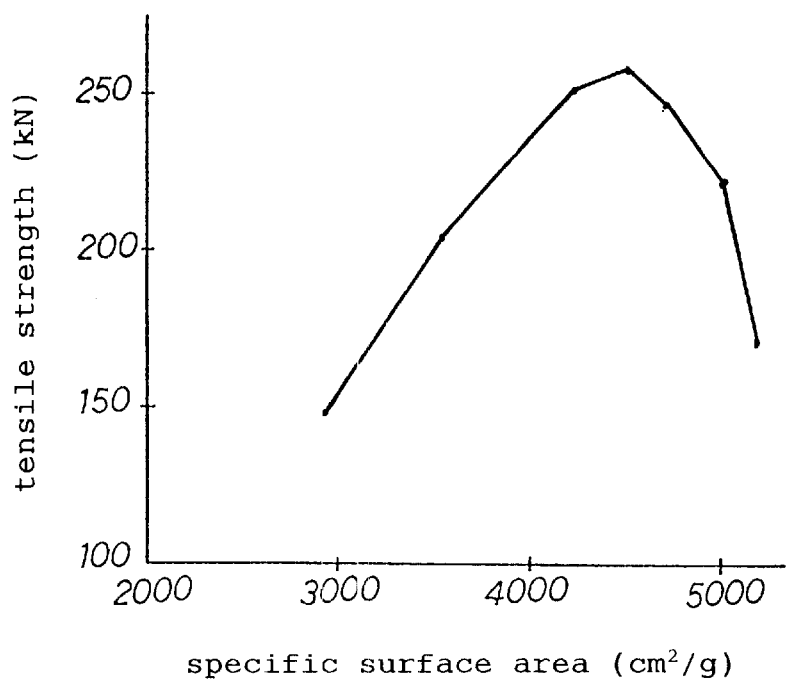
FIG. 3 is a graph showing a relationship between the tensile strength and the specific surface area of an alumina cement that forms a cement mortar cured body.

The workability (flow value and repulsion force value) of assembling each of these suspension type insulators and the strength properties (tensile strength) of the obtained suspension type insulators are shown in Table 6. Also, the relationship between the specific surface area of the alumina cement and the flow value obtained in this experiment is shown in the graph of FIG. 2, and the relationship between the specific surface area of the alumina cement and the tensile strength of the suspension type insulator is shown in the graph of FIG. 3.

TABLE 6

(type of alumina cement mortar)

| cement mortar (No) | specific surface area ($cm^2/g$) | 1/2 flow value (mm) | tensile strength (kN) | evaluation |
|---|---|---|---|---|
| 1 | 2941 | 300 or more | 148 | X |
| 2 | 3545 | 300 or more | 204 | ○ |
| 3 | 4213 | 300 or more | 253 | ⊚ |
| 4 | 4516 | 300 or more | 259 | ⊚ |
| 5 | 4704 | 300 or more | 247 | ⊚ |
| 6 | 4992 | 281 | 222 | ⊚ |
| 7 | 5188 | 238 | 171 | X | thickness of amorphous phase of alumina cement particles: 10 nm to 50 nm
evaluation: ⊚...good, ○...fairly good, X...poor In Table 6, cement mortars (No. 2) to (No. 6) are according to Examples of the present invention, while the cement mortar (No. 1) and (No. 7) are according to Comparative Examples. Cement mortars (No. 2) to (No. 6) have a suitable flow value, the workability of assembling the suspension type insulator is good in the same manner as the case of using a conventional Portland cement mortar, and the suspension type insulators have a high tensile strength. In contrast, in cement mortar (No. 1), though having a suitable flow value, the specific surface area of the alumina cement is small, so that the tensile strength of the suspension type insulator is not sufficient. In cement mortar (No. 7), since the specific surface area of the alumina cement is too large, the workability of assembling the suspension type insulator is poor, and the tensile strength of the suspension type insulator is not sufficient. The results in cement mortar (No. 7) seem to be due to the influence of the surface activity of the alumina cement. The larger the specific surface area of the alumina cement is, the larger the surface activity of the alumina cement is. Therefore, if one considers the surface activity, the surface area of usable alumina cements has an upper limit of 5000 cm$^2$/g.

Example 6

In this Example also, an experiment was carried out to confirm a suitable range of the properties (specific surface area and thickness of the amorphous phase that the alumina cement particles have) of the alumina cement for forming the alumina cement mortar used as a source material of a cement mortar cured body in the work of assembling a suspension type insulator (with porcelain sand).

The alumina cement mortars put to use are seven kinds of alumina cement mortar having a composition containing an alumina cement, a water reducing agent (0.3 wt % with respect to alumina cement), and an aggregate (silica sand: 25 wt % with respect to alumina cement) having an average particle diameter of 250 μm with a water ratio (W/C) of 25%. Each of the alumina cements used for the preparation of the alumina cement mortars has a composition containing 55 wt % of $Al_2O_3$, 35 wt % of CaO, 5 wt % of $SiO_2$, and 0.5 wt % of $Fe_2O_3$, and all have a specific surface area of 4866 cm$^2$/g.

However, regarding the thickness of the amorphous phase that the particles of each alumina cement have on the outer peripheral surface, the thickness of the amorphous phase is adjusted as shown in Table 7 by leaving an alumina cement, which has been produced by a grinding process and has a specific surface area of 4866 cm$^2$/g, to stand in an atmosphere with a temperature of 20° C. to 30° C. and a relative humidity of 50% to 70% for a suitable number of days within the range from 5 days to 200 days.

Figure 4:
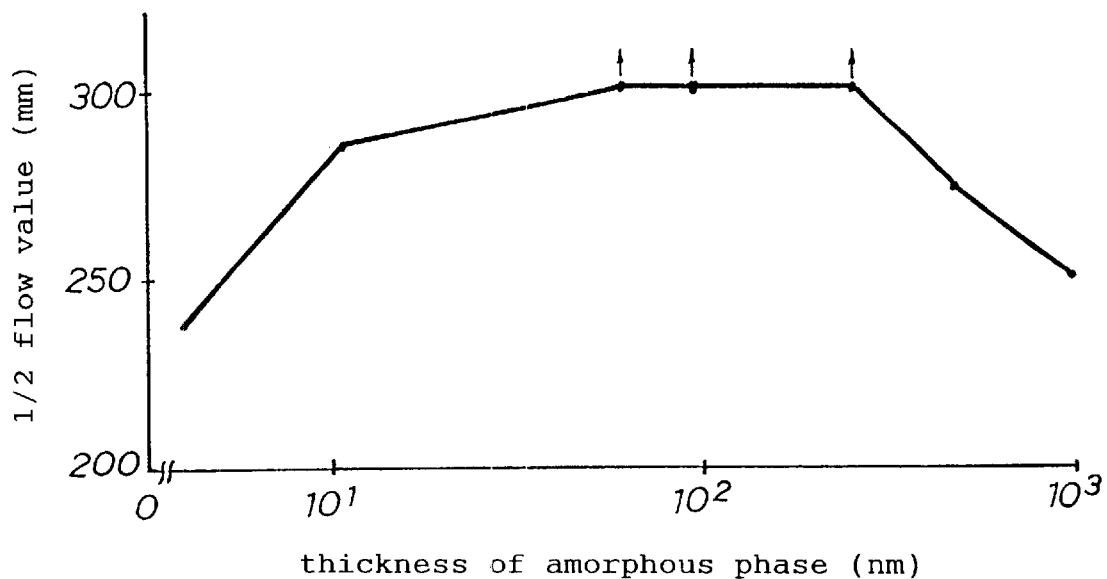
FIG. 4 is a graph showing a relationship between the flow value and the thickness of the amorphous phase of alumina cement particles that form a cement mortar cured body.
Figure 5:
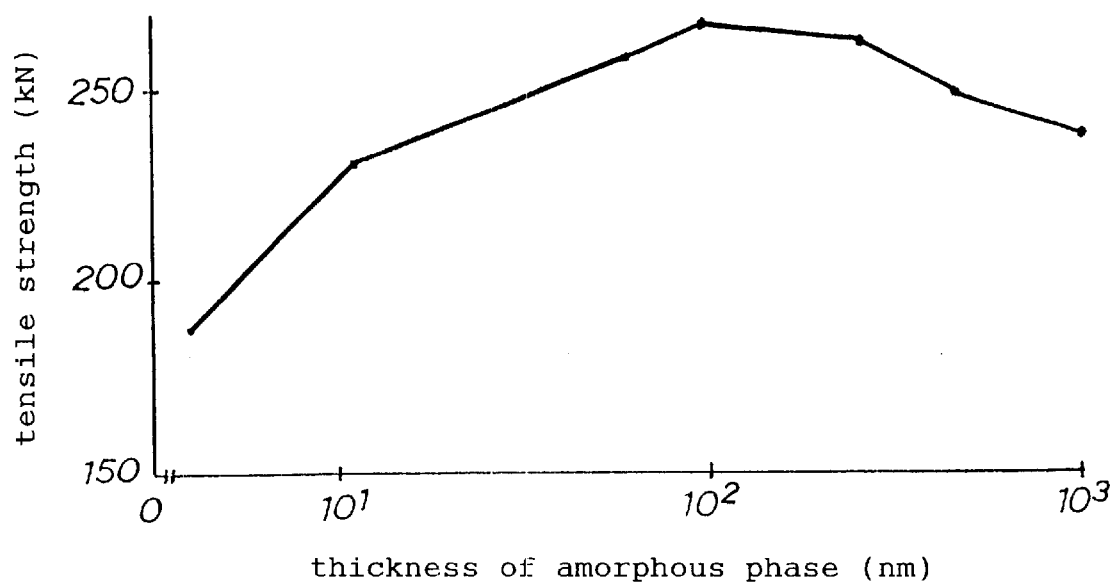
FIG. 5 is a graph showing a relationship between the tensile strength and the thickness of the amorphous phase of alumina cement particles that form a cement mortar cured body.

The workability (flow value) of assembling these suspension type insulators and the strength properties (tensile strength) of the obtained suspension type insulators are shown in Table 7. Also, the relationship between the thickness of the amorphous phase of the alumina cement and the flow value obtained in this experiment is shown in the graph of FIG. 4, and the relationship between the thickness of the amorphous phase of the alumina cement and the tensile strength of the suspension type insulator is shown in the graph of FIG. 5.

TABLE 7

| (type of alumina cement mortar) | | | | |
|---|---|---|---|---|
| cement mortar (No) | thickness of amorphous phase (nm) | 1/2 flow value (mm) | tensile strength (kN) | evaluation |
| 1 | 1.4 | 238 | 187 | X |
| 2 | 11 | 285 | 230 | ○ |
| 3 | 63 | 300 or more | 259 | ⊙ |
| 4 | 99 | 300 or more | 266 | ⊙ |
| 5 | 256 | 300 or more | 262 | ⊙ |
| 6 | 482 | 274 | 249 | ○ |
| 7 | 981 | 249 | 238 | ○ | specific surface area of alumina cement: 4866 cm$^2$/g
evaluation: ⊙...good, ○...fairly good, X...poor In Table 7, cement mortars (No. 2) to (No. 7) are according to Examples of the present invention, while cement mortar (No. 1) is according to Comparative Example. Cement mortars (No. 2) to (No. 7) have an appropriate flow value, the workability of assembling the suspension type insulator is good in the same manner as in the case of using a conventional Portland cement mortar, and the suspension type insulator has a high tensile strength. In contrast, in cement mortar (No. 1), since the thickness of the amorphous phase of alumina cement particles is small, the flow value is small and the tensile strength of the suspension type insulator is not sufficient.

While the invention has been shown and described in detail, the foregoing description is in all aspects illustrative and not restrictive. It is therefore understood that numerous other modifications and variations can be devised without departing from the scope of the invention.

What is claimed is:

1. An insulator comprising an insulator body and a hardware member joined to at least one side of said insulator body via a kneaded cement cured body, said kneaded cement cured body comprising a cement paste formed by kneading a mixture of alumina cement particles having a specific surface area of at least 3500 cm$^2$/g and having an amorphous phase of at least 10 nm thickness on an outer peripheral surface of said particles, a water reducing agent, and water, said cement paste being cured in a wet state and at a temperature of 40° C. or higher to form said cured body.

2. The insulator according to claim 1, wherein said specific surface area of said alumina cement particles is within a range of 3500 cm$^2$/g to 5000 cm$^2$/g, and said thickness of said amorphous phase is within a range of 10 nm to 103 nm.

3. The insulator according to claim 1, wherein said water reducing agent is added in an amount of 5 wt % or less and said water is added in an amount within a range of 15 wt % to 30 wt % with respect to said alumina cement particles.

4. An insulator comprising an insulator body and a hardware member joined to at least one side of said insulator body via a kneaded cement cured body, said kneaded cement cured body comprising a cement mortar formed by kneading a mixture of alumina cement particles having a specific surface area of at least 3500 cm$^2$/g and having an amorphous phase of at least 10 nm thickness on an outer peripheral surface of said particles, a water reducing agent, an aggregate, and water, said cement mortar being cured in a wet state and at a temperature of 40° C. or higher to form said cured body.

5. The insulator according to claim 4, wherein said specific surface area of said alumina cement particles is within a range of 3500 cm$^2$/g to 5000 cm$^2$/g, and said thickness of said amorphous phase is within a range of 10 nm to $10^3$ nm.

6. The insulator according to claim 4, wherein said water reducing agent is added in an amount of 5 wt % or less, said aggregate is added in an amount of 100 wt % or less, and said water is added in an amount within a range from 15 wt % to 30 wt % with respect to said alumina cement particles.

7. The insulator according to claim 1, wherein said thickness of said amorphous phase is increased by increasing a length of time said alumina cement particles are left to stand before mixing to form said cement paste.

8. The insulator according to claim 1, wherein said alumina cement particles further comprise $Al_2O_3$ in an amount within a range of 45 wt % to 60 wt %, CaO in an amount within a range of 30 wt % to 40 wt %, $SiO_2$ in an amount of 10 wt % or less, and $Fe_2O_3$ in an amount of 5 wt % or less.

9. An insulator comprising an insulator body and a hardware member joined to at least one side of said insulator body via a kneaded cement cured body, said kneaded cement cured body comprising a cement paste formed by kneading a mixture of alumina cement particles having a specific surface area of at least 3500 cm$^2$/g, a polymer-steric-hindrance water reducing agent, and water, said cement paste being cured in a wet state and at a temperature of 40° C. or higher to form said cured body.

10. The insulator according to claim 9, wherein said polymer-steric-hindrance water reducing agent comprises a comb-shaped polymer of polycarboxylate series or an aminosulfonate polymer.

11. The insulator according to claim 9, wherein said water reducing agent is added in an amount of 5 wt % or less and said water is added in an amount within a range of 15 wt % to 30 wt % with respect to said alumina cement particles.

12. An insulator comprising an insulator body and a hardware member joined to at least one side of said insulator body via a kneaded cement cured body, said kneaded cement cured body comprising a cement mortar formed by kneading a mixture of alumina cement particles having a specific surface area of at least 3500 cm$^2$/g, a polymer-steric-hindrance water reducing agent, an aggregate, and water, said cement mortar being cured in a wet state and at a temperature of 40° C. or higher to form said cured body.

13. The insulator according to claim 12, wherein said polymer-steric-hindrance water reducing agent comprises a comb-shaped polymer of polycarboxylate series or an aminosulfonate polymer.

14. The insulator according to claim 12, wherein said water reducing agent is added in an amount of 5 wt % or less, said aggregate is added in an amount of 100 wt % or less, and said water is added in an amount within a range from 15 wt % to 30 wt % with respect to said alumina cement particles.

15. The insulator according to claim 9, wherein said alumina cement particles further comprise $Al_2O_3$ in an amount within a range of 45 wt % to 60 wt %, CaO in an amount within a range of 30 wt % to 40 wt %, $SiO_2$ in an amount of 10 wt % or less, and $Fe_2O_3$ in an amount of 5 wt % or less.

16. The insulator according to claim 4, wherein said thickness of said amorphous phase is increased by increasing a length of time said alumina cement particles are left to stand before mixing to form said cement mortar.

17. The insulator according to claim 4, wherein said alumina cement particles further comprise $Al_2O_3$ in an amount within a range of 45 wt % to 60 wt %, CaO in an amount within a range of 30 wt % to 40 wt%, $SiO_2$ in an amount of 10 wt % or less, and $Fe_2O_3$ in an amount of 5 wt % or less.

18. The insulator according to claim 5, wherein said thickness of said amorphous phase is increased by increasing a length of time said alumina cement particles are left to stand before mixing to form said cement mortar.

19. The insulator according to claim 5, wherein said alumina cement particles further comprise $Al_2O_3$ in an amount within a range of 45 wt % to 60 wt %, CaO in an amount within a range of 30 wt % to 40 wt %, $SiO_2$ in an amount of 10 wt % or less, and $Fe_2O_3$ in an amount of 5 wt % or less.

20. The insulator according to claim 12, wherein said alumina cement particles further comprise $Al_2O_3$ in an amount within a range of 45 wt % to 60 wt %, CaO in an amount within a range of 30 wt % to 40 wt %, $SiO_2$ in an amount of 10 wt % or less, and $Fe_2O_3$ in an amount of 5 wt % or less.

* * * * *

UNITED STATES PATENT AND TRADEMARK OFFICE
CERTIFICATE OF CORRECTION

PATENT NO.     : 6,599,647 B2
DATED          : July 29, 2003
INVENTOR(S)    : Noriyasu Oguri, Osamu Imai and Hironori Suzuki It is certified that error appears in the above-identified patent and that said Letters Patent is hereby corrected as shown below:

<u>Column 18,</u>
Line 18, please change "103 nm" to -- $10^3$ nm --.

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,599,647 B2
DATED         : July 29, 2003
INVENTOR(S)   : Noriyasu Oguri, Osamu Imai and Hironori Suzuki It is certified that error appears in the above-identified patent and that said Letters Patent is hereby corrected as shown below:

<u>Column 18,</u>
Line 30, please change "103 nm" to -- $10^3$ nm --.

This certificate supersedes Certificate of Correction issued November 4, 2003.

Signed and Sealed this

Twentieth Day of April, 2004

JON W. DUDAS
*Acting Director of the United States Patent and Trademark Office*